(12) United States Patent
Marrero

(10) Patent No.: US 6,477,730 B1
(45) Date of Patent: Nov. 12, 2002

(54) AIRCRAFT MAINTENANCE APPARATUS AND METHOD OF MAINTAINING AIRCRAFT

(75) Inventor: Lou Marrero, Shalimar, FL (US)

(73) Assignee: Omnics, Inc., Newington, VA (US)

( * ) Notice: Subject to any disclaimer, the term of this patent is extended or adjusted under 35 U.S.C. 154(b) by 0 days.

(21) Appl. No.: 09/694,716

(22) Filed: Oct. 23, 2000

Related U.S. Application Data

(60) Division of application No. 09/174,511, filed on Oct. 16, 1998, now Pat. No. 6,134,734, which is a continuation-in-part of application No. 09/161,610, filed on Sep. 25, 1998, now Pat. No. 5,979,001, and a continuation-in-part of application No. 08/786,829, filed on Jan. 21, 1997, now Pat. No. 5,858,111.

(51) Int. Cl.[7] .............................. B60S 3/00; B64F 5/00
(52) U.S. Cl. ........................ 15/53.1; 15/53.2; 15/97.3; 180/7.1; 180/7.2; 180/20; 180/41
(58) Field of Search ................ 15/53.1, 53.2, 15/53.3, 97.1, 97.3; 180/7.1, 7.2, 20, 41

(56) References Cited

U.S. PATENT DOCUMENTS

| | | | |
|---|---|---|---|
| 3,439,372 A | | 4/1969 | Collier |
| 3,551,934 A | | 1/1971 | Franzreb |
| 3,730,287 A | * | 5/1973 | Fletcher |
| 3,835,498 A | | 9/1974 | Arato |
| 3,882,885 A | * | 5/1975 | McCain |
| 4,193,505 A | | 3/1980 | Satterberg et al. .......... 212/231 |
| 4,273,244 A | | 6/1981 | Jensen et al. |
| 4,646,875 A | | 3/1987 | Sholl |
| 4,715,460 A | * | 12/1987 | Smith |
| 5,092,012 A | | 3/1992 | Rabourne et al. |
| 5,115,531 A | | 5/1992 | Suzuki |
| 5,490,646 A | | 2/1996 | Shaw et al. |
| 5,673,626 A | | 10/1997 | Jaeggi |
| 5,690,240 A | | 11/1997 | Thiermann, Sr. |
| 5,701,966 A | | 12/1997 | Amico |
| 5,720,069 A | | 2/1998 | Wanner et al. |
| 5,746,396 A | | 5/1998 | Thorton-Trump |
| 5,769,954 A | | 6/1998 | Wanner et al. |
| 5,858,111 A | | 1/1999 | Marrero |
| 5,979,001 A | | 11/1999 | Marrero |
| 6,134,734 A | | 10/2000 | Marrero |
| 6,360,865 B1 | | 3/2002 | Leon |
| 2001/0008985 A1 | | 7/2001 | Wada |
| 2002/0002939 A1 | | 1/2002 | Beauchesne et al. |

OTHER PUBLICATIONS

AIRTRAX Inc. Website Brochure Jan. 17, 2002.

* cited by examiner

Primary Examiner—Randall E. Chin
(74) Attorney, Agent, or Firm—Bracewell & Patterson, LLP

(57) ABSTRACT

An apparatus and methods are provided for performing maintenance procedures such as washing, cleaning, deicing, and painting to an aircraft. The apparatus according to an embodiment of the present invention preferably has a mobile base having a plurality of wheel members for allowing the mobile base to travel along surfaces and a plurality of support surface registering members for registering the mobile base to a support surface to inhibit movement of the plurality of wheel members. The apparatus also preferably has a boom member having a proximal end portion rotatably mounted to the mobile base and being movable between a retracted position and an extended position and an aircraft maintenance tool rotatably connected to a distal end portion of the boom member.

12 Claims, 19 Drawing Sheets

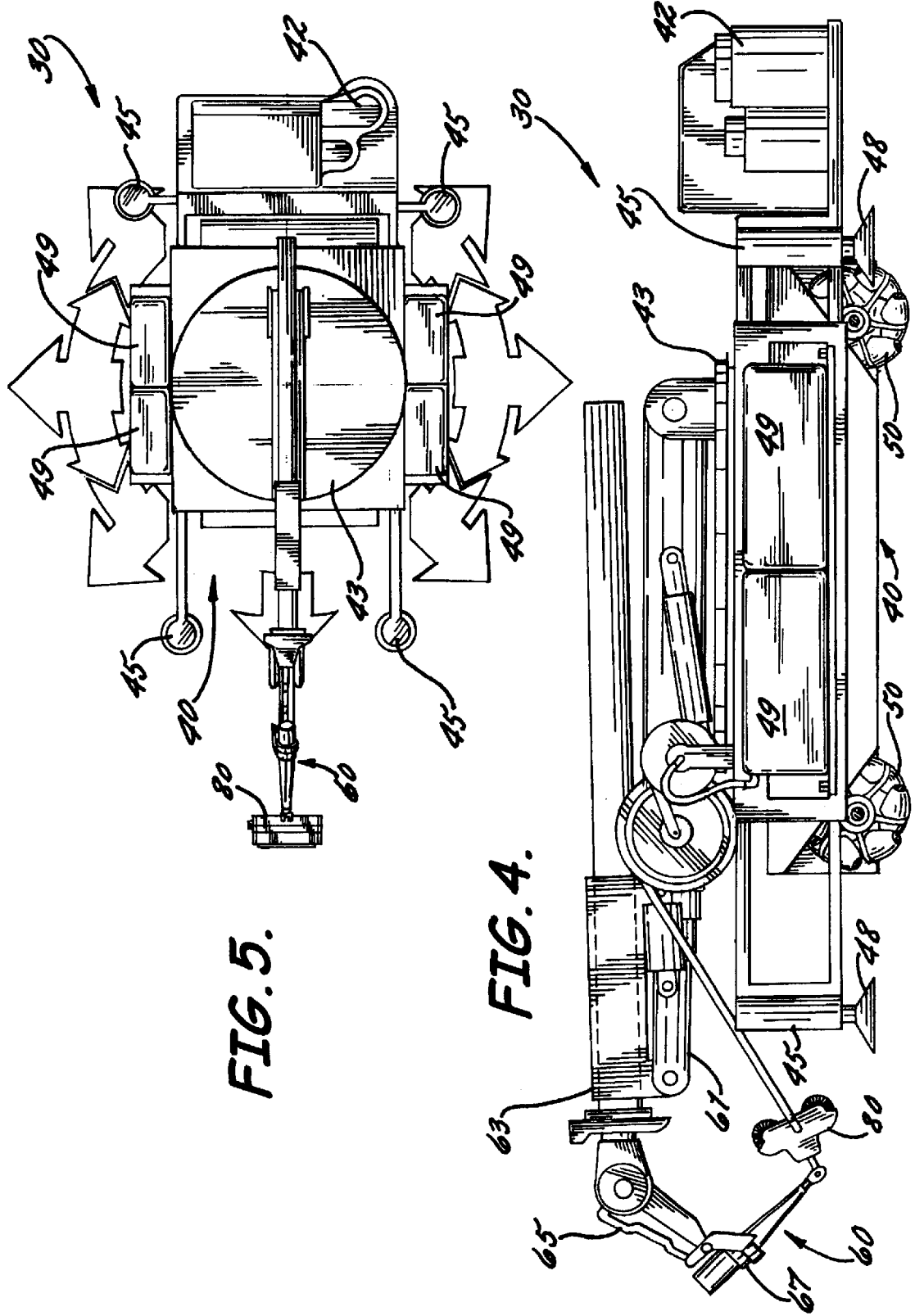

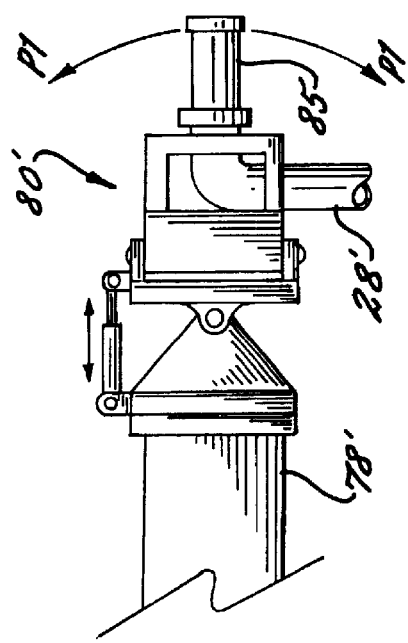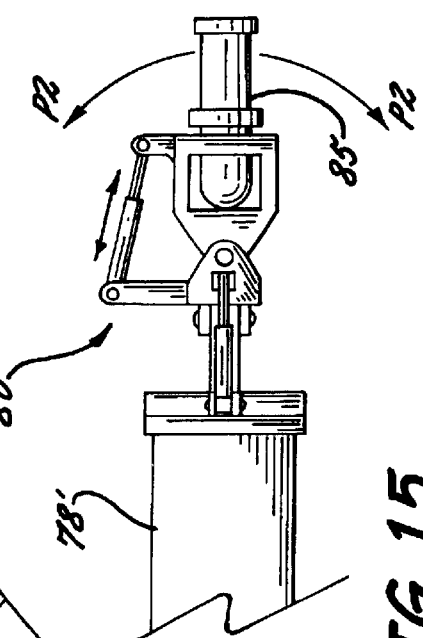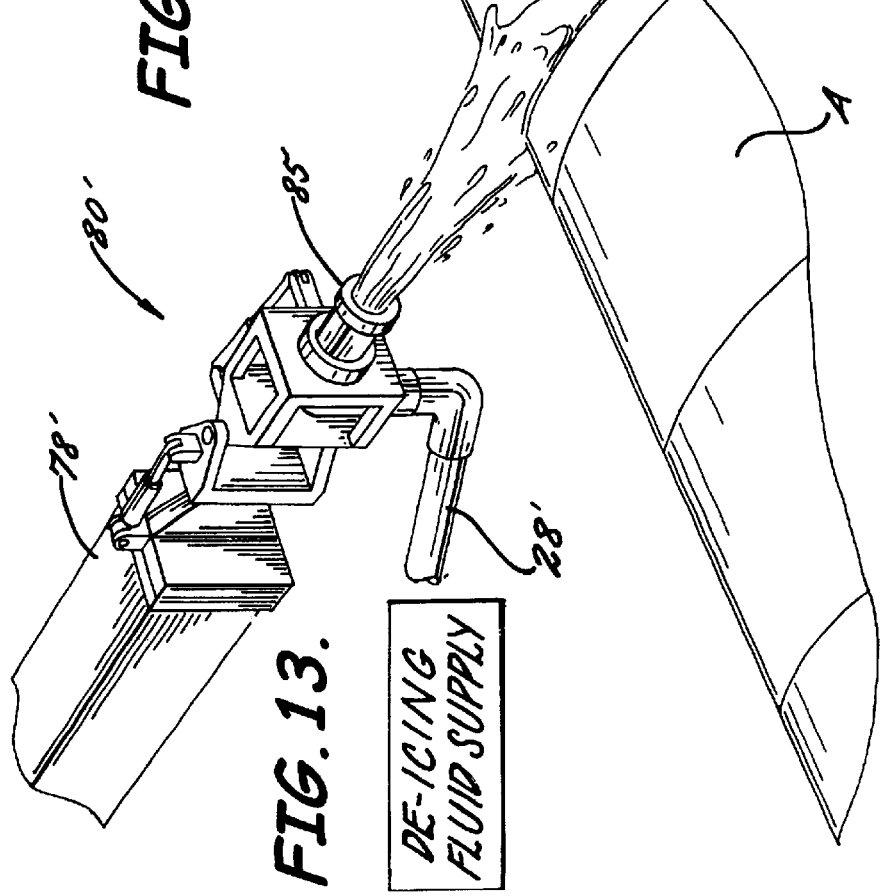

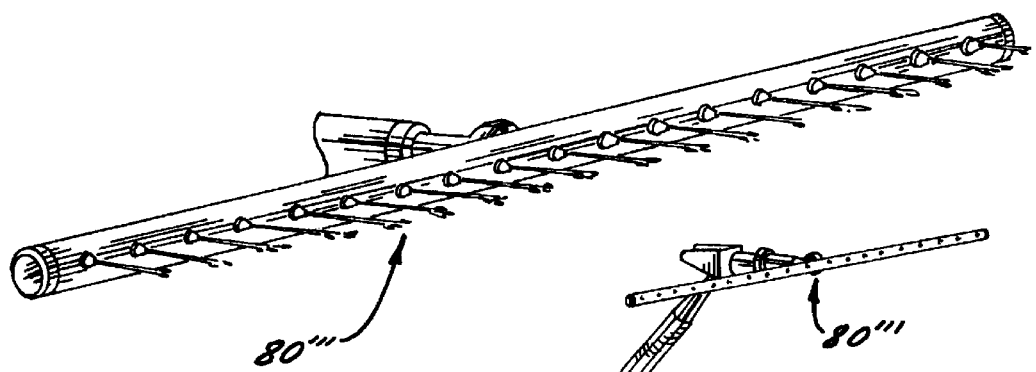
FIG. 22.
FIG. 21.
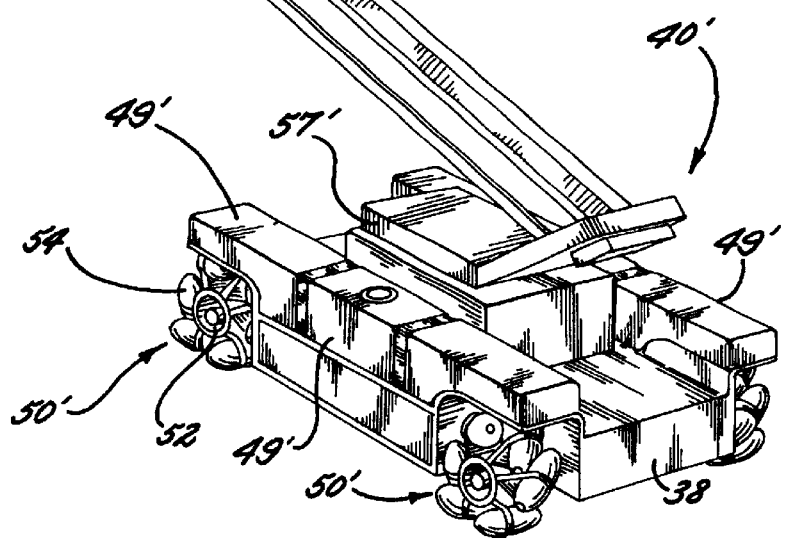

US 6,477,730 B1

AIRCRAFT MAINTENANCE APPARATUS AND METHOD OF MAINTAINING AIRCRAFT

RELATED APPLICATIONS

This application is a divisional of U.S. Ser. No. 09/174,511 filed Oct. 16, 1998, now U.S. Pat. No. 6,134,734, the disclosure of which is hereby incorporated by reference in its entirety which is a continuation-in-part of U.S. patent application Ser. No. 08/786,829, filed on Jan. 21, 1997, now U.S. Pat. No. 5,858,111, and U.S. patent application Ser. No. 09/161,610, filed on Sep. 25, 1998, now U.S. Pat. No. 5,979,001, and which are both incorporated herein in their entireties by reference.

FIELD OF THE INVENTION

The present invention relates to the field of aviation and, more particularly, to the maintenance of aircraft.

BACKGROUND OF THE INVENTION

Over the years, various aircraft maintenance equipment has been developed for maintaining various portions of an aircraft. This aircraft maintenance equipment has included washing, cleaning, deicing, painting, polishing, sanding, grinding, and/or other maintenance functions. Such systems conventionally provide an aircraft cleaning or painting apparatus which has a pair of spaced-apart tracks for positioning an aircraft therebetween and a track base slidably mounted to each track. An example of such a system can be seen in U.S. Pat. No. 5,458,299 by Collins et al. titled "Aircraft Deicing Apparatus". Other systems provide an aircraft cleaning or painting apparatus that has a boom pivotally mounted to a slidable support base. Examples of such an apparatus can be seen in U.S. Pat. No. 5,490,646 by Shaw et al. titled "Aircraft Maintenance Robot", U.S. Pat. No. 5,318,254 by Shaw et al. titled "Aircraft Maintenance Robot", and U.S. Pat. No. 3,835,498 by Arato titled "Craft Washing Plant". Still other systems provide overhead tracks under which an aircraft or other vehicle passes for providing maintenance such as painting, cleaning, or deicing. Examples of this type of system can be seen in French EPO-0341-134 Published Patent Application by Jonca and U.S. Pat. No. 5,320,121 by Alexanian titled "Vehicle Washing System".

These conventional aircraft maintenance systems, however, attempt to provide movement of a washing, cleaning, deicing, painting, polishing, sanding, or grinding apparatus by complex boom type systems which often require an expensive installation facility which includes extensive installation obstacles to overcome. These systems also often distribute the weight of the apparatus performing the maintenance functions either with the structure, i.e., building, hangar, garage, itself or at a substantial distance from the aircraft. This operational requirement, in turn, requires the extensive boom-type or robotic-type arms which extend outwardly from a base to perform the maintenance operation. These boom-type arms conventionally carry extensive electronics and can be quite expensive to manufacture. Other problems associated with these boom-type arms include the risk from damage to the long outwardly extending arms by moving aircraft, the requirement of complex and expensive control of the arm at a base a distance away from the aircraft, and the lack of effective control of the arm, e.g., to track the contour of the aircraft, and the maintenance tools adjacent the aircraft.

SUMMARY OF THE INVENTION

With the foregoing in mind, the present invention advantageously provides an apparatus and method for maintaining an aircraft that provides effective control of maintenance tools adjacent the aircraft. The present invention also advantageously provides an apparatus and method to track or follow the contour of the aircraft by providing the weight of the control of the maintenance tool adjacent the aircraft and reducing the problems and risks associated with the use of a long boom-type arm extending outwardly from hangar walls or roofs to provide the maintenance functions. The present invention additionally advantageously provides an aircraft maintenance a apparatus and method with increased degrees of freedom of movement for movement of a maintenance tool in the X, Y, and Z planes.

More particularly, an apparatus for maintaining an aircraft according to an embodiment of the present invention preferably has a mobile base having a plurality of wheel members for allowing the mobile base to travel along surfaces and a plurality of support surface registering members for registering the mobile base to a support surface to inhibit movement of the plurality of wheel members. The apparatus also preferably has a boom member having a proximal end portion rotatably mounted to the mobile base and being movable between a retracted position and an extended position and an aircraft maintenance tool rotatably connected to a distal end portion of the boom member.

According to another aspect of the present invention, an apparatus for maintaining an aircraft preferably includes a mobile base, a boom member having a proximal end portion rotatably mounted to said mobile base. The boom member is preferably movable between a retracted position and an extended position. The apparatus also preferably includes an aircraft maintenance tool rotatably connected to a distal end portion of the boom member.

According to yet another aspect of the present invention, an apparatus for maintaining an aircraft preferably includes a mobile base including rotating means for providing rotational movement of the mobile base on a support surface, a boom member having a proximal end portion rotatably mounted to the mobile base, and an aircraft maintenance tool connected to a distal end portion of the boom member.

The present invention also provides a maintenance tool such as for an aircraft. The maintenance tool preferably includes a tool housing, a pair of roll members having at least portions thereof mounted in the tool housing, and driving means connected to the tool housing for rotatably driving the pair of roll members in opposite rotational directions.

Another embodiment of a maintenance tool such as for maintaining an aircraft preferably includes a tool housing, a nozzle connected to the tool housing, and nozzle moving means connected to the tool housing for pivotally moving the nozzle in a first plane and for pivotally moving the nozzle in a second different plane.

The present invention also includes a mobile vehicle which preferably has a base having at least upper and lower portions and a drive connected to the base. A plurality of wheels are connected to a lower portion of the base and are also each connected to the drive so that the plurality wheels responsively move the base in a plurality of different directions, e.g., radial directions, responsive to the drive. The lower portion of the base includes a plurality of recessed regions into each of which one of the plurality of wheels is mounted. Each of the wheels of the vehicle preferably include a hub and a plurality of roller members dispersed around the hub. Each of the plurality of wheels is drivable or movable responsive to the drive in a selected direction independent of each of the other plurality of wheels. Also, a plurality of leveling legs can be connected to the base for leveling the base in selected positions. The plurality of leveling leg are preferably being movable between retracted and extended positions.

The present invention also provides a method of maintaining an aircraft. The method preferably includes rotating a boom member connected to a base, extending the boom member from a retracted position, and rotating an aircraft maintenance tool connected to the boom member during operation of a maintenance procedure upon an aircraft. The method can also include rotating the base about a support surface.

Another method according to the present invention preferably includes a method of treating a surface. The method preferably includes the steps of providing a pair of roll members having surface treating means associated therewith and rotationally driving the pair of roll members in opposite rotational directions. The method can also include each of the pair of roll members having a roller and a roller cover. The roller cover includes a plurality of surface contact members associated therewith. Also, each of the rollers can advantageously be inflatable, and the method further including inflating each of the inflatable rollers.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 4 is a side elevational view of an aircraft maintenance apparatus in a retracted position according to a first embodiment of the present invention;

FIG. 5 is a top plan view of an aircraft maintenance apparatus according to a first embodiment of the present invention;

FIG. 13 is a fragmentary perspective view of a deicing tool of an aircraft maintenance apparatus according to a third embodiment of the present invention;

FIG. 14 is a side elevational view of a deicing tool of an aircraft maintenance apparatus of FIG. 13 according to the present invention;

FIG. 15 is a top plan view of a deicing tool of an aircraft maintenance apparatus of FIG. 11 according to the present invention;

FIG. 21 is a perspective view of an aircraft maintenance apparatus having another embodiment of a maintenance tool according to the present invention;

FIG. 22 is a perspective view of an aircraft maintenance tool of an aircraft maintenance apparatus according to the present invention.

DETAILED DESCRIPTION OF PREFERRED EMBODIMENTS

The present invention will now be described more fully hereinafter with reference to the accompanying drawings which illustrated preferred embodiments of the invention. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 1:
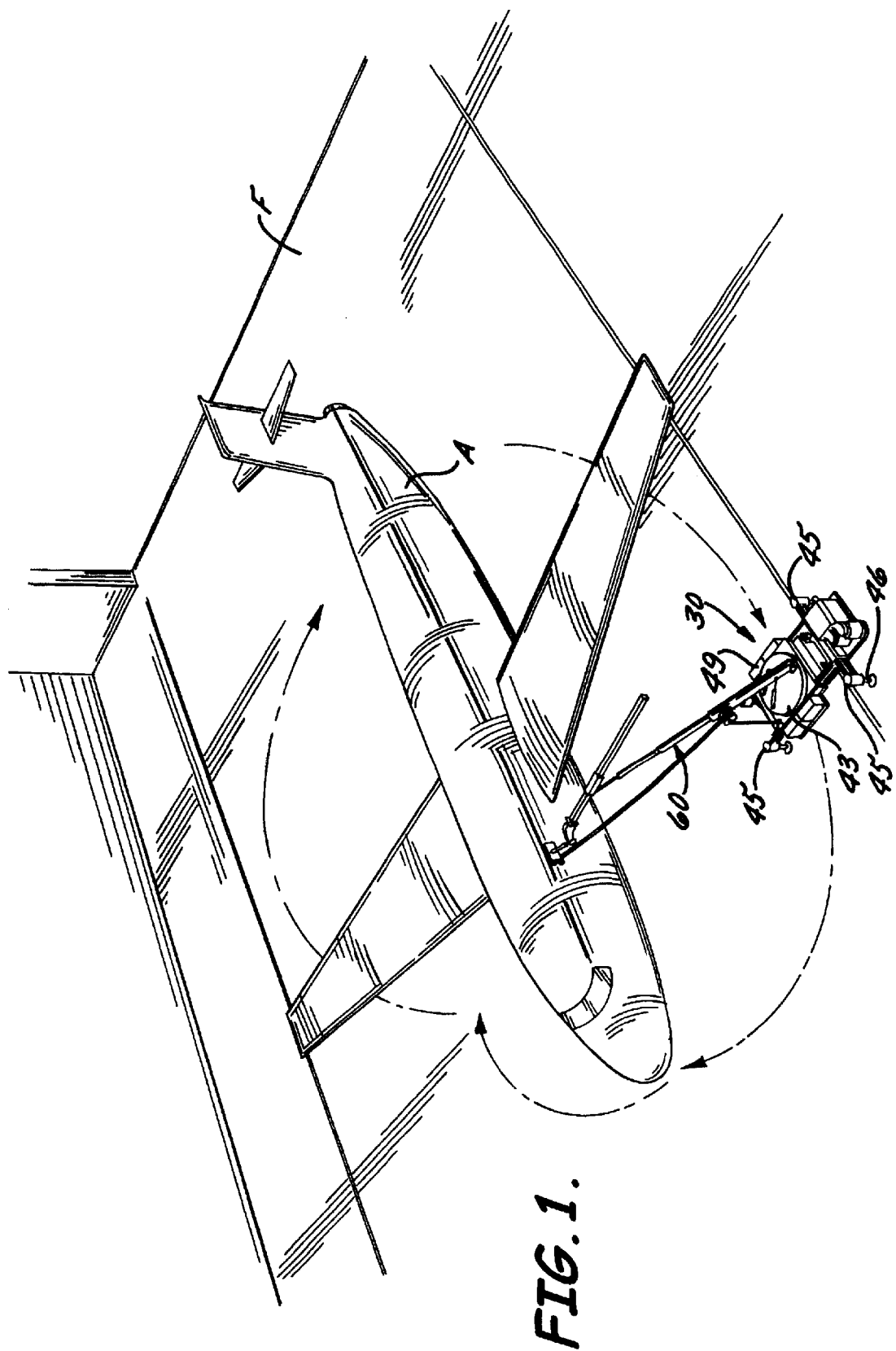
FIG. 1 is an environmental perspective view of an aircraft maintenance apparatus operating on an airplane in a hangar according to a first embodiment of the present invention.
Figure 11:
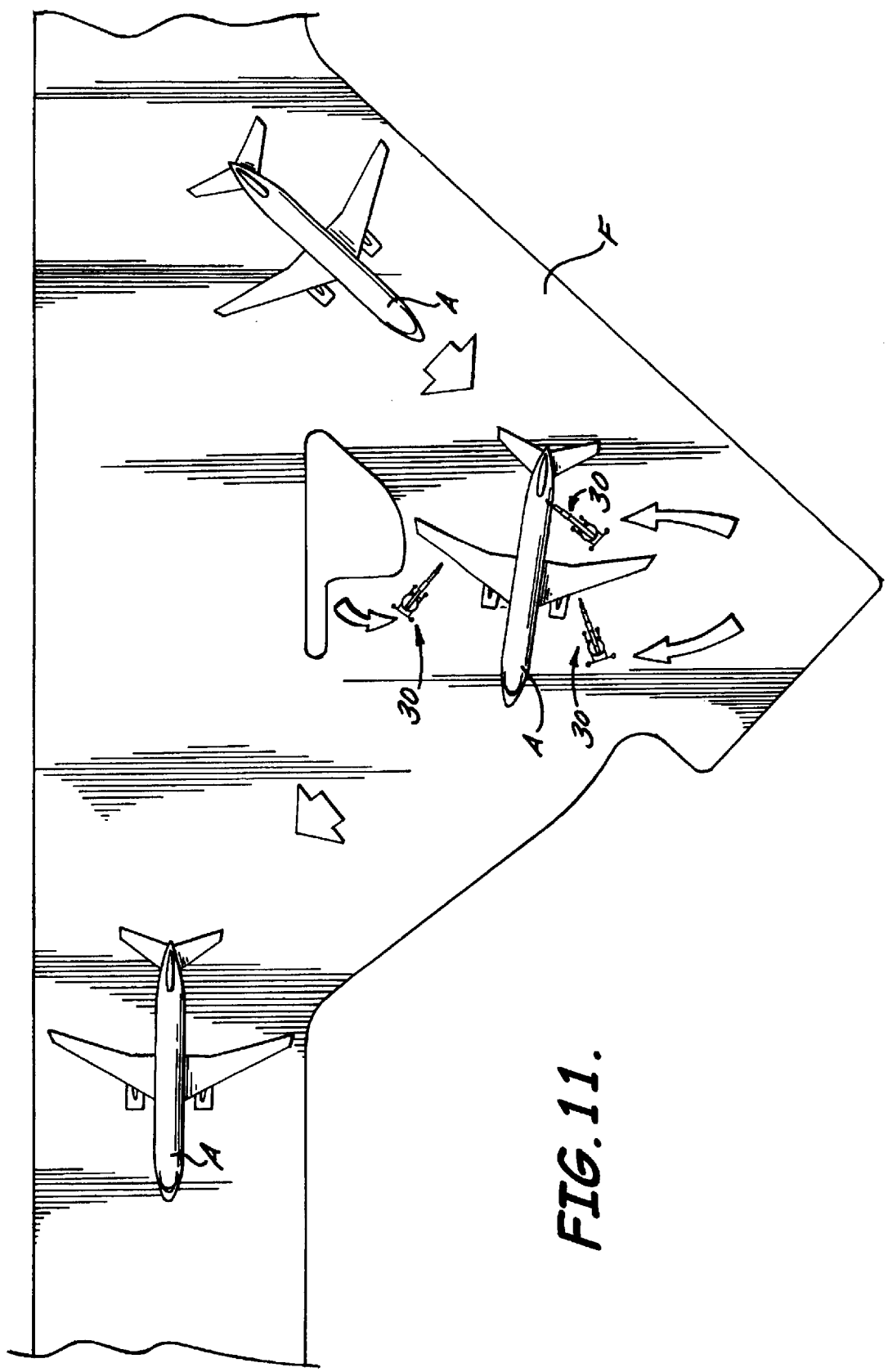
FIG. 11 is an environmental top plan view of a plurality of aircraft maintenance apparatuses according to an embodiment of the present invention.
Figure 12:
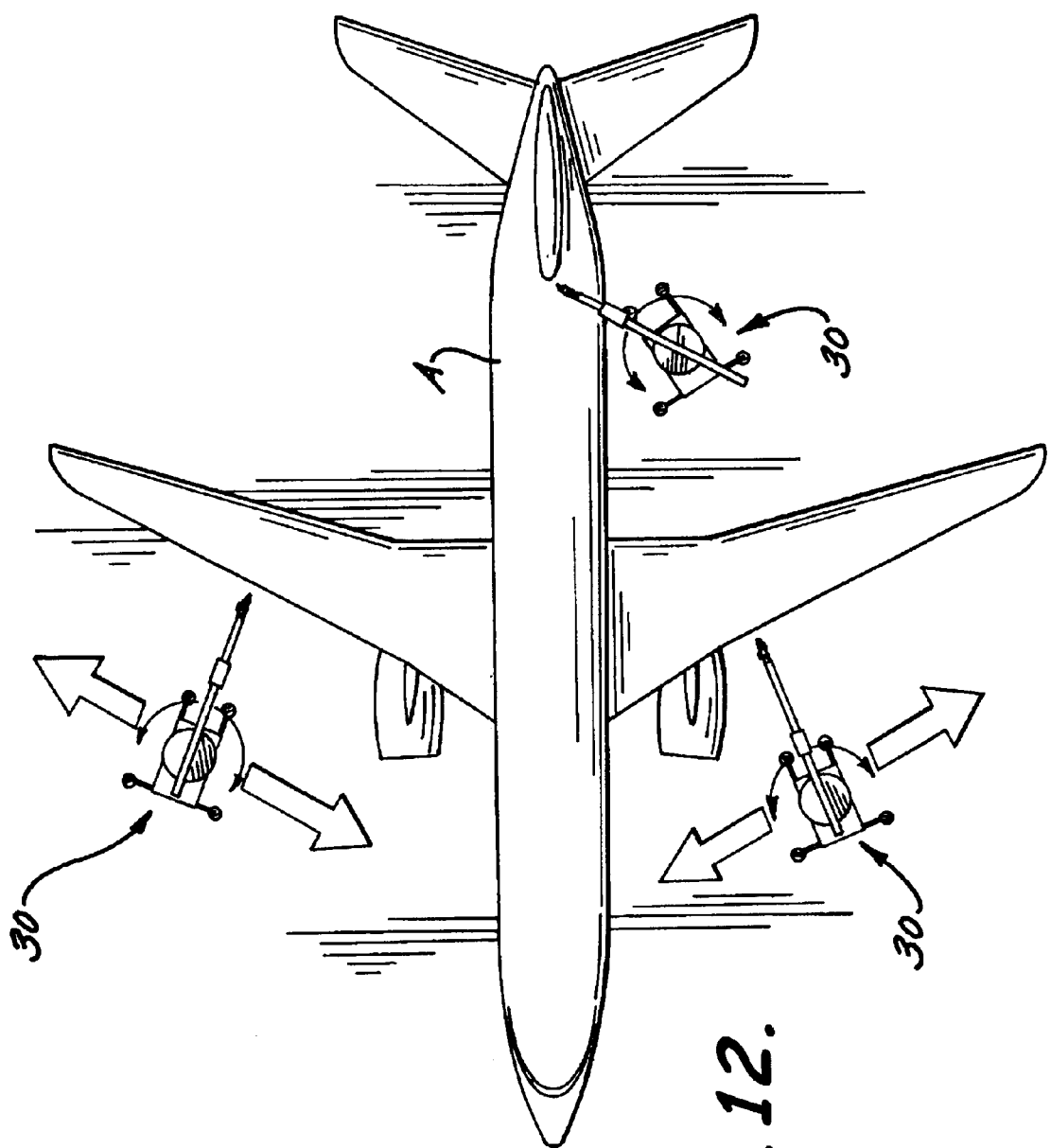
FIG. 12 is a top plan view of a plurality of aircraft maintenance apparatuses operating on an airplane according to an embodiment of the present invention.
Figure 16:
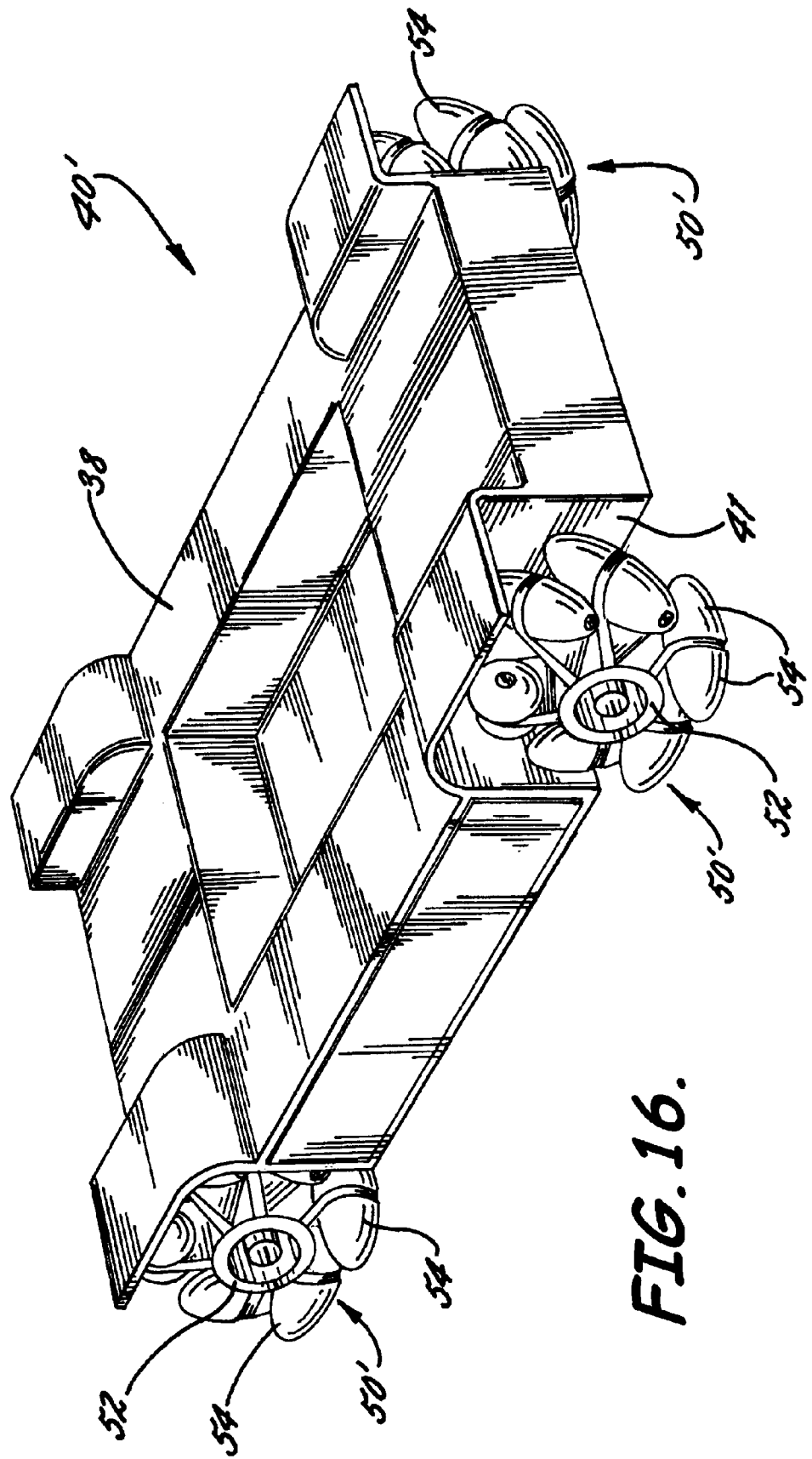
FIG. 16 is a perspective view of a mobile base portion of an aircraft maintenance apparatus according to the present invention.
Figure 17:
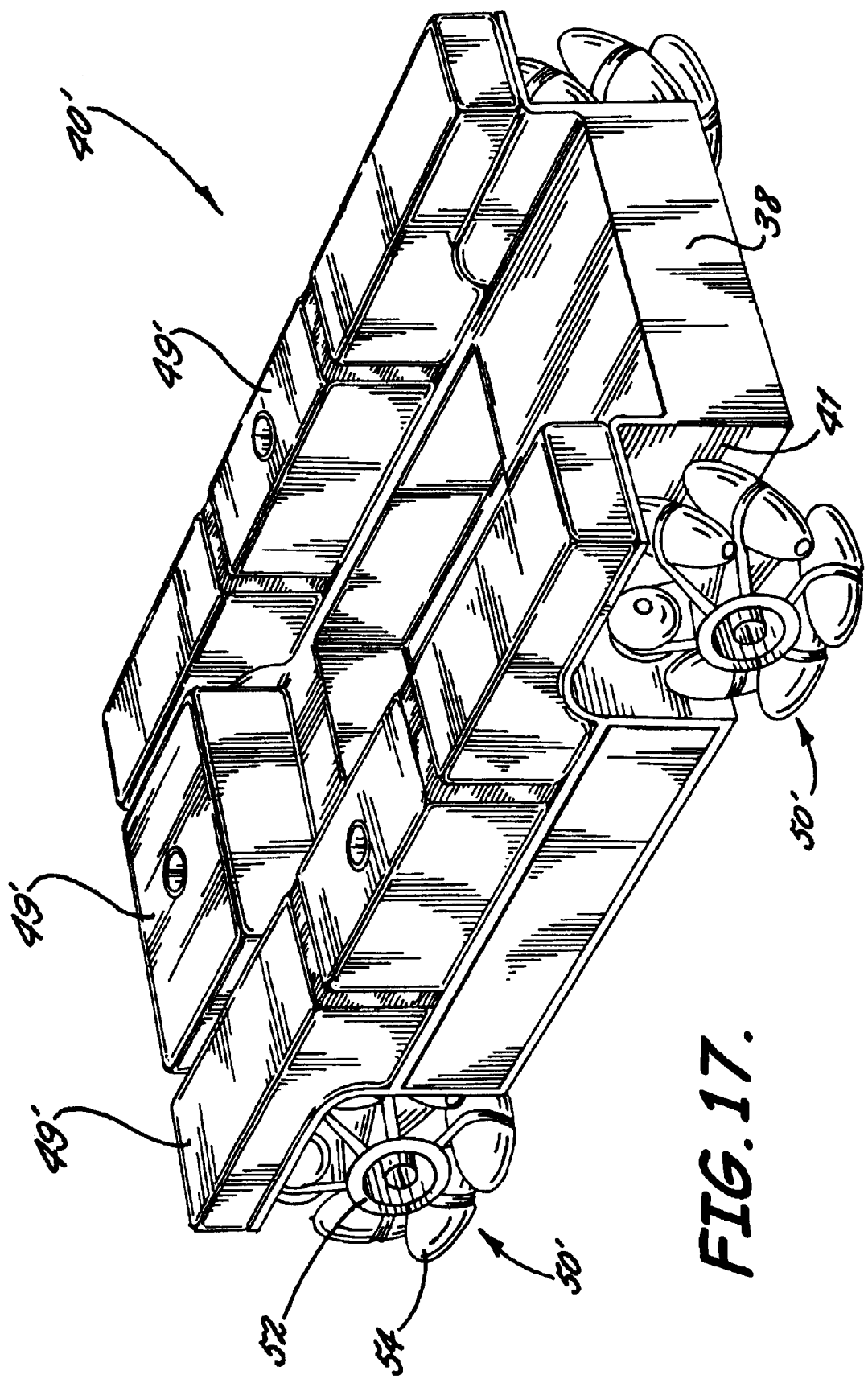
FIG. 17 is a perspective view of an aircraft maintenance apparatus having a plurality of auxiliary maintenance modules added to a mobile base portion thereof according to the present invention.
Figure 18:
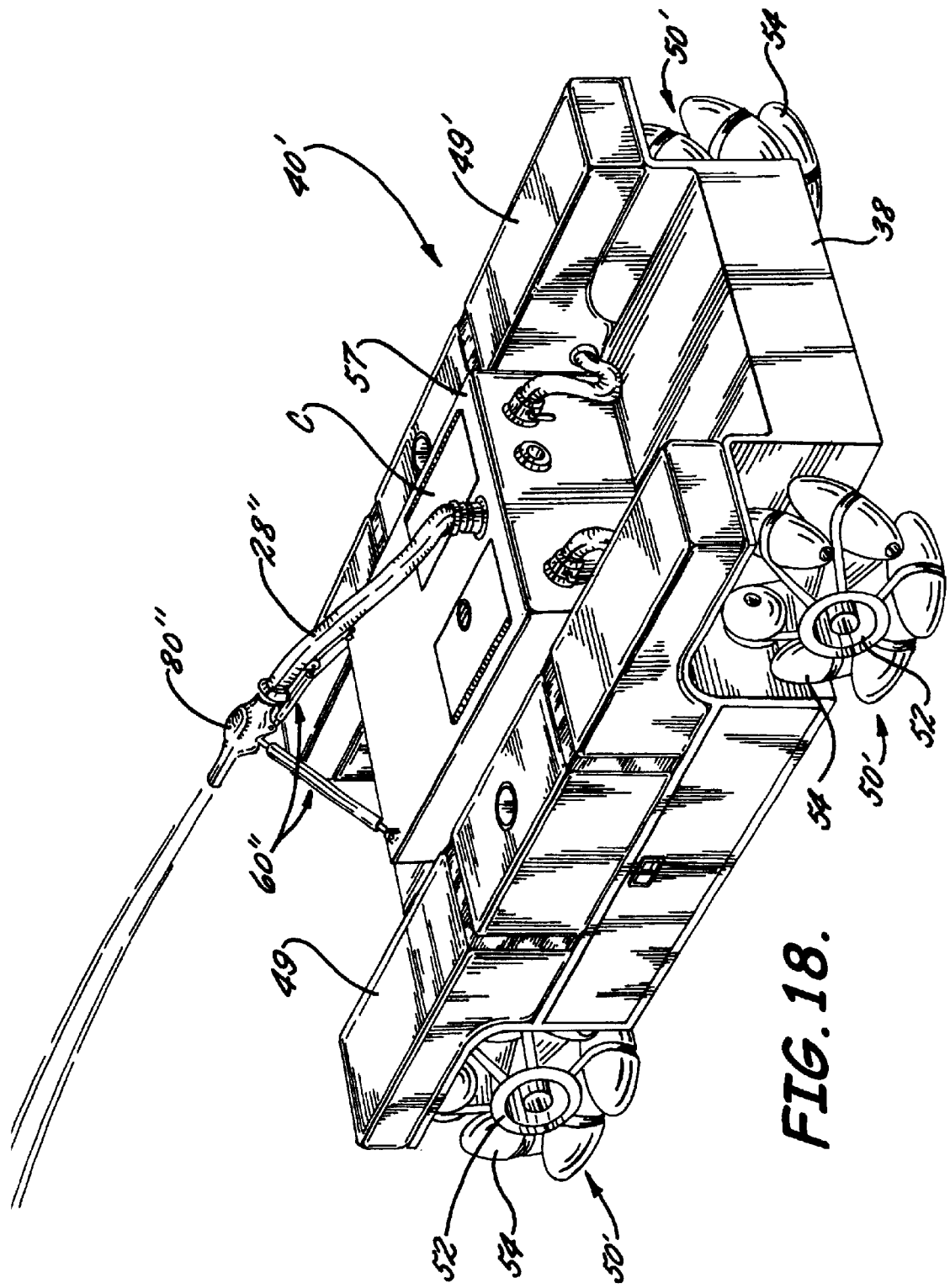
FIG. 18 is a perspective view of an aircraft maintenance apparatus having an aircraft maintenance module added thereto according to the present invention.

FIGS. 1 and 11–12 illustrate environmental views of an aircraft A maintenance apparatus 30 according to a first embodiment of the present invention. The aircraft A as illustrated is generally mounted to or rolls along a support surface or floor F. The floor F of a maintenance hangar, warehouse, or other maintenance region, for example, is preferably slanted toward a drain for collecting waste fluid run-off from the washing, de-icing, painting, or other maintenance process. The apparatus 30 preferably has the capability to perform maintenance tasks along the fuselage, wings, tail, and nose sections of the aircraft.

An apparatus 30 for maintaining an aircraft A according to an embodiment of the present invention preferably has a mobile base 40 having a plurality of wheel members 50 for allowing the mobile base 40 to travel along surfaces F and a plurality of support surface registering members 45 for registering the mobile base 40 to a support surface to inhibit movement of the plurality of wheel members 50. The plurality of support surface registering members 45 preferably each include a leveling leg 46 which extends and retracts generally in a vertical plane. The registering members 45 also can extend and retract in transverse or horizontal planes, as illustrated.

The mobile base 40 can also advantageously include a plurality of auxiliary maintenance modules, e.g., fluid tanks 49 for supplying fluid to one or more maintenance tools associated with the apparatus 30. The apparatus 30 also preferably has a boom member 60 having a proximal end portion rotatably mounted to the mobile base 40 and being movable between a retracted position and an extended position and at least one aircraft maintenance tool 80 rotatably connected to a distal end portion of the boom member 60.

Figure 2:
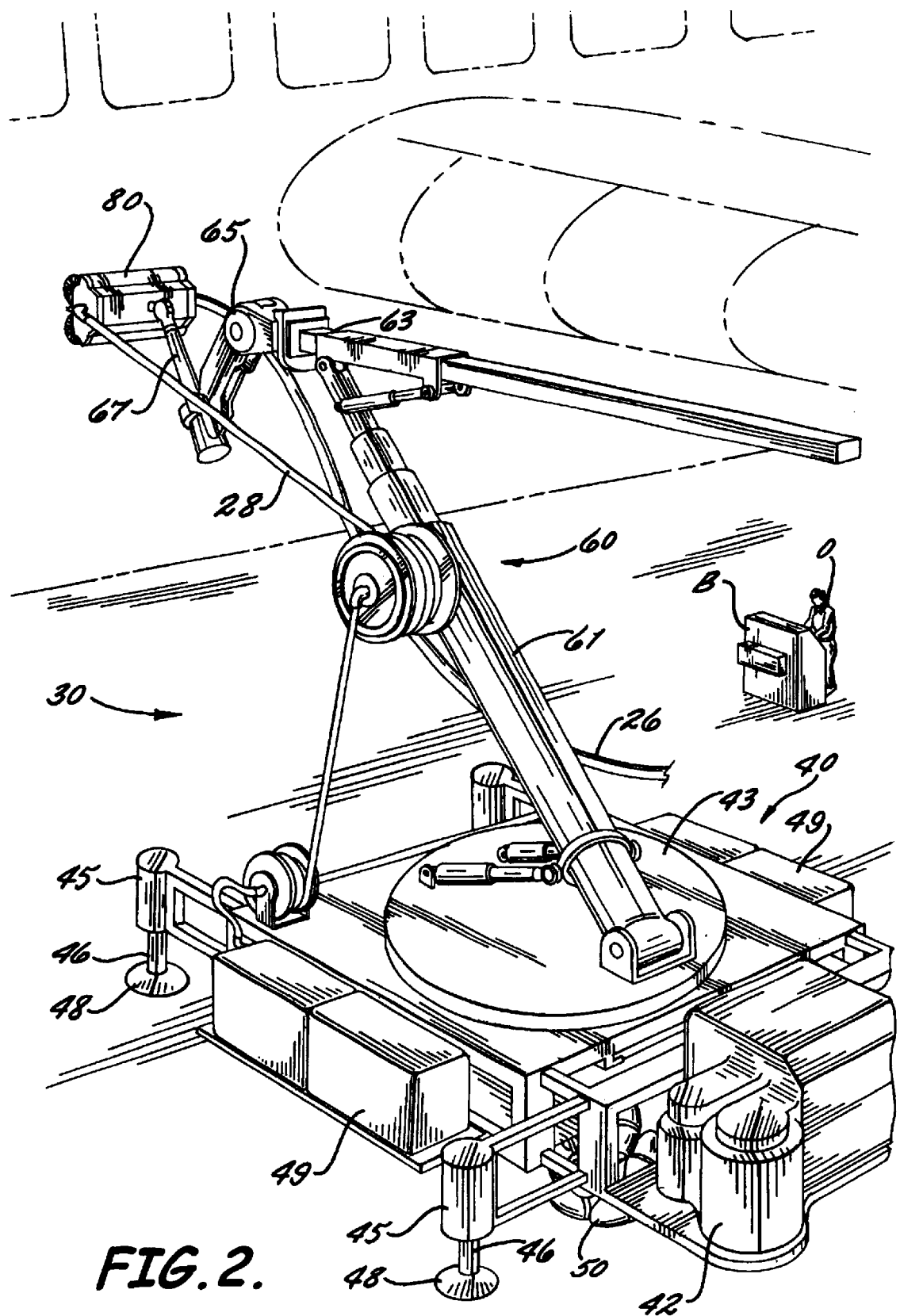
FIG. 2 is a perspective view of an aircraft maintenance apparatus in an extended position according to a first embodiment of the present invention and illustrating portions of an airplane in broken lines.
Figure 3:
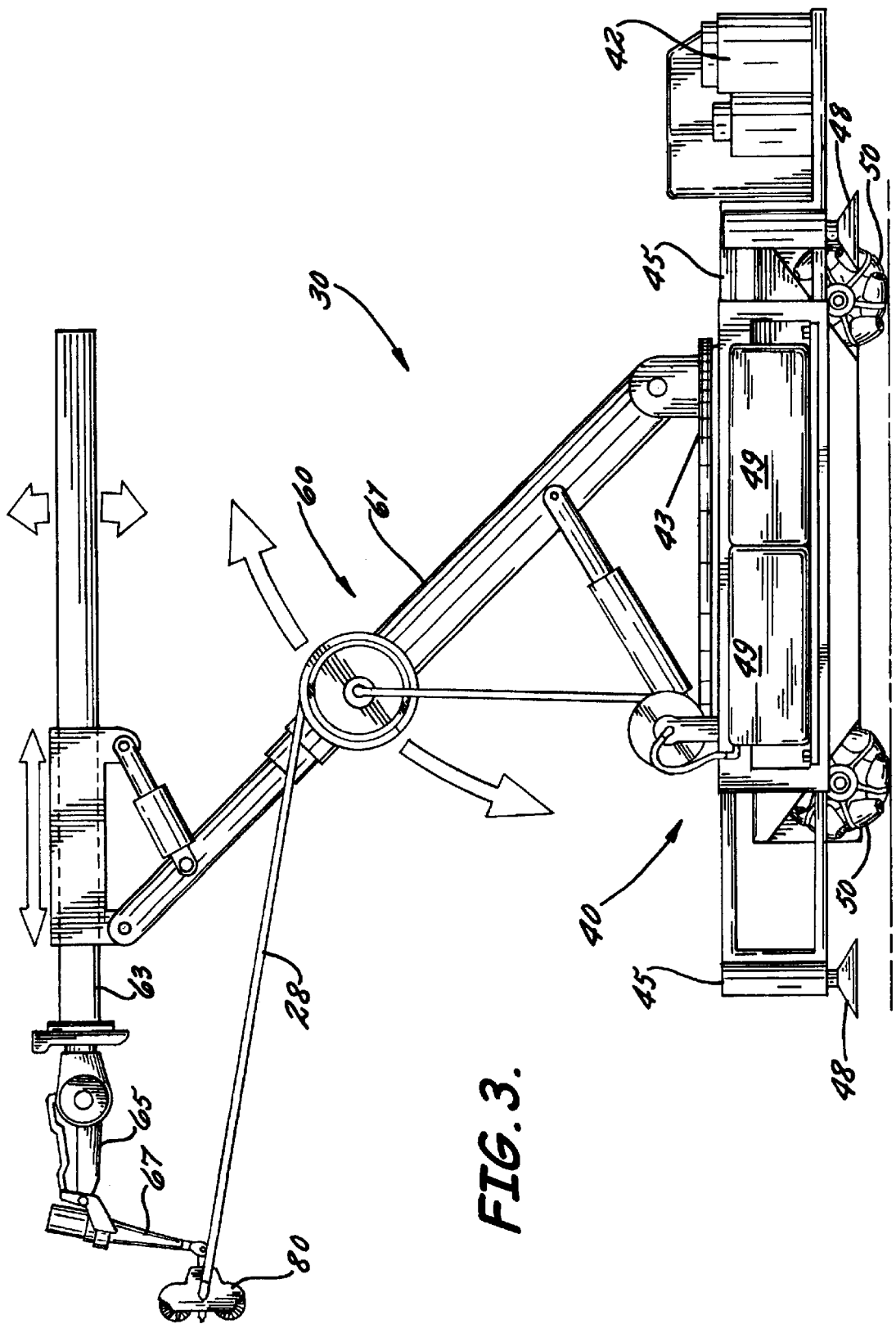
FIG. 3 is side elevational view of an aircraft maintenance apparatus in an extended position according to a second embodiment of the present invention.
Figure 6:
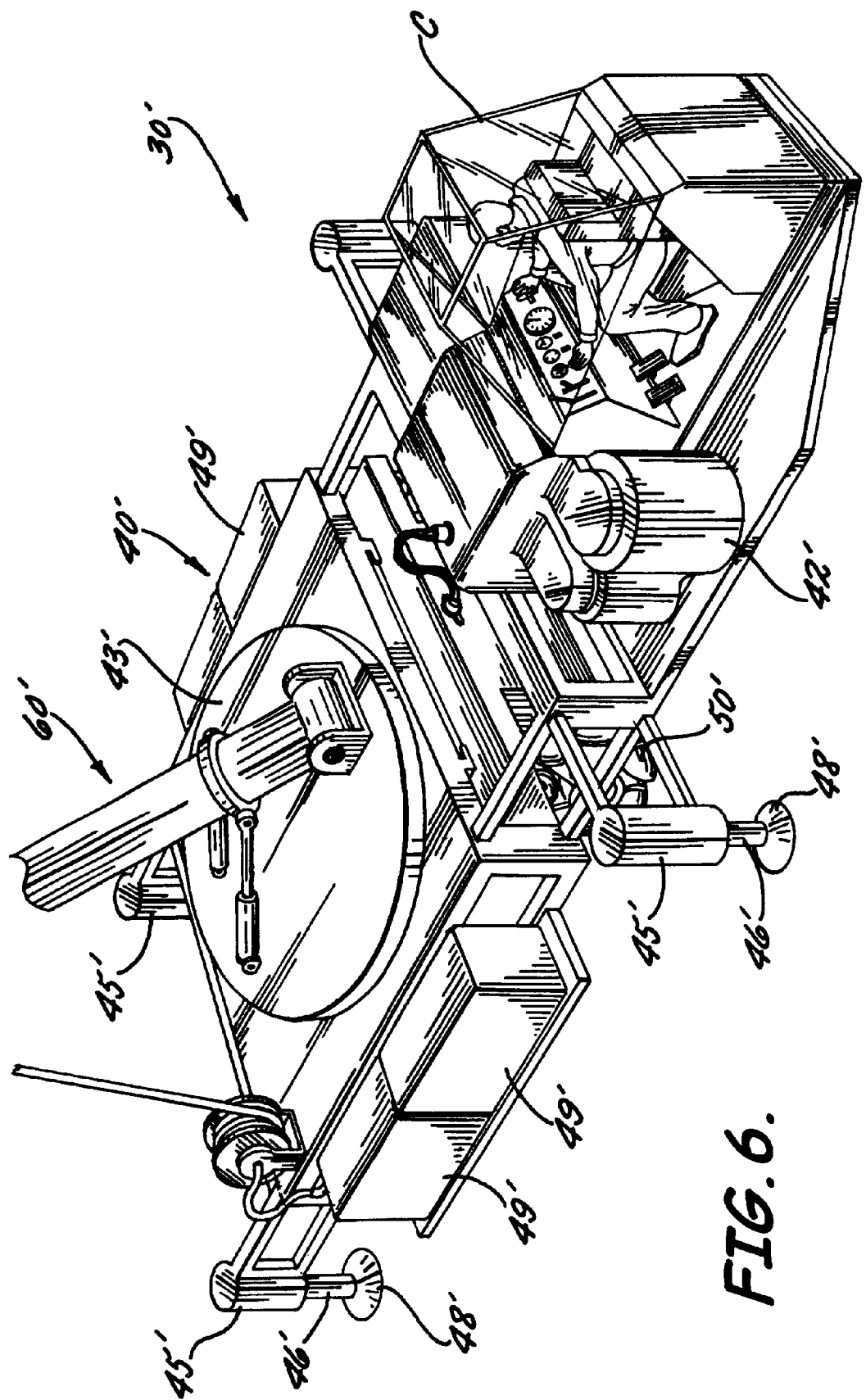
FIG. 6 is a perspective view of an aircraft maintenance apparatus according to a second embodiment of the present invention.

FIG. 2 illustrates an operator O remotely Operating the apparatus 30 from a remote operator booth B 25 according to a first embodiment of the present invention. As illustrated in FIG. 6, the mobile base 40' of a second embodiment of an apparatus 30' can further have an operator cab C for positioning an operator O therein and for operating the apparatus 30' from the mobile base 40'. The mobile base 40' also preferably includes at least one drive 42, e.g., an engine and a drive assembly, for driving the wheels 50' of the mobile base 40'.

FIGS. 2–5 and 8 illustrate structural features of the boom member 60 and the operation of the boom member 60, the mobile base 40, and the maintenance tool 80. Each of the plurality of wheel members 50 of the mobile base 40 includes an omni-directional vehicle wheel for providing at least forward, lateral, diagonal, and rotational motion of the mobile base 40 (see FIG. 5 arrows). The mobile-base 40 also has a rotatable platform, 43 positioned along an upper end portion-thereof. The plurality of support surface registering members 45 each preferably includes a support surface contact member or legs 46 and a hydraulic engaging member 48 connected to the support surface contact member 46 for hydraulically engaging the support surface contact member 46 with the support surface F.

The boom member 60 preferably includes a first-boom arm 61 which has a proximal end portion pivotally connected to the rotatable platform 43 of the mobile base 40 and which has a retracted position (see FIG. 4) and an extended position (see FIG. 3), e.g., by the use of a piston and cylinder connector assembly. A second boom arm 63 has a proximal end portion mounted to the first boom arm 61 and likewise has a retracted position and an extended position. A third boom arm 65 has a medial portion pivotally mounted to the distal end portion of the second boom arm 63 and also has a retracted position and an extended position. The boom member 60 further preferably includes yet a fourth boom arm 67 having a proximal end portion rotatably mounted to a distal end portion of the third boom arm 65.

Figure 8:
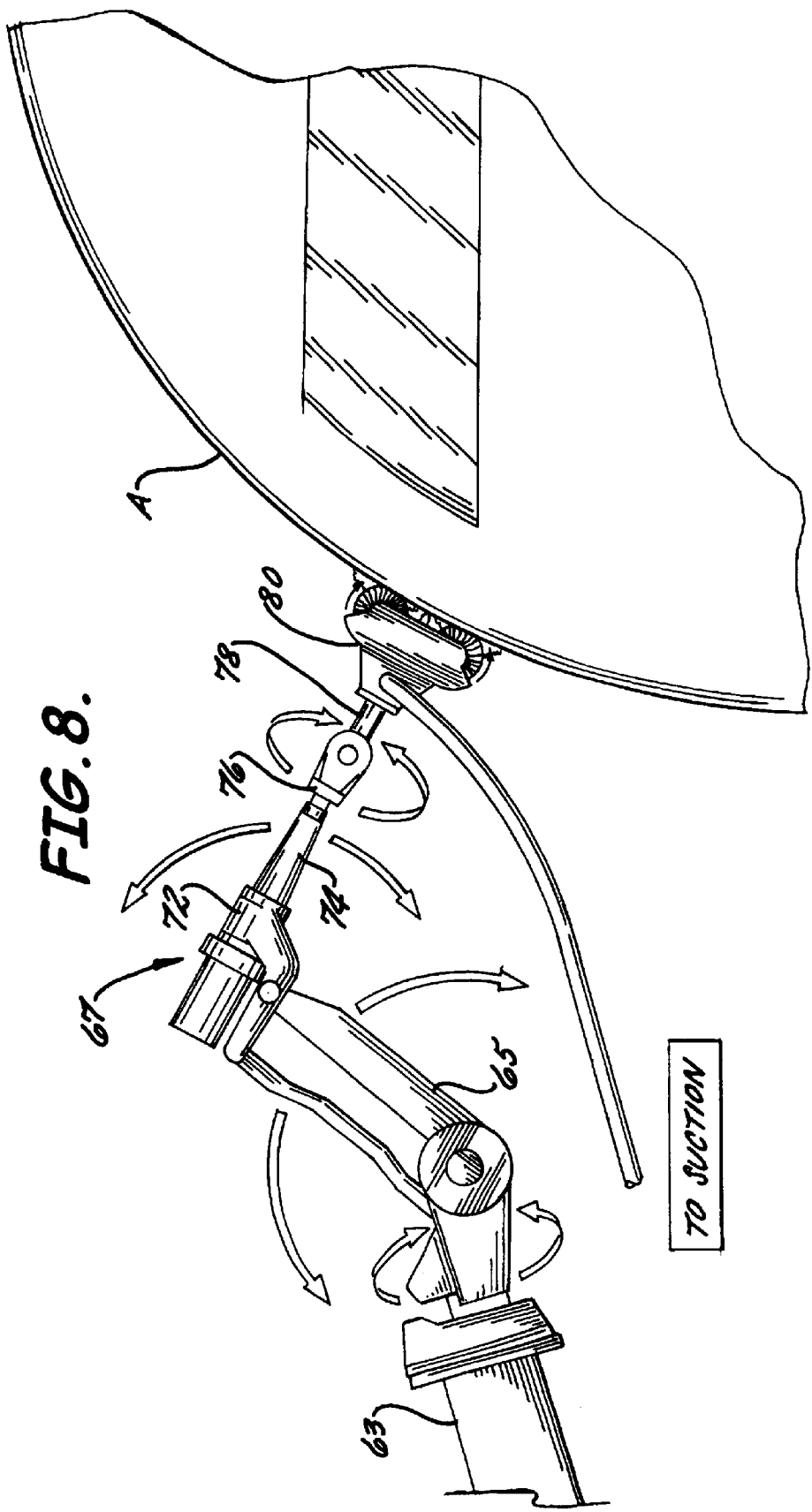
FIG. 8 is a fragmentary side elevational view of an aircraft maintenance apparatus and an airplane according to an embodiment of the present invention.

As perhaps best illustrated in FIG. 8, the fourth boom arm 67 includes a plurality of arm links. The plurality of arm links include a first arm link 72 having a proximal end rotatably connected to the distal end portion of the third boom arm 65, a second arm link 74 having a proximal end pivotally connected to the distal end of the first arm link 72, a third arm link 76 having a proximal end portion rotatably or pivotally connected to the second arm link 74, and a fourth arm link 78 having a proximal end rotatably connected to the distal end of the third arm link 76.

Figure 9:
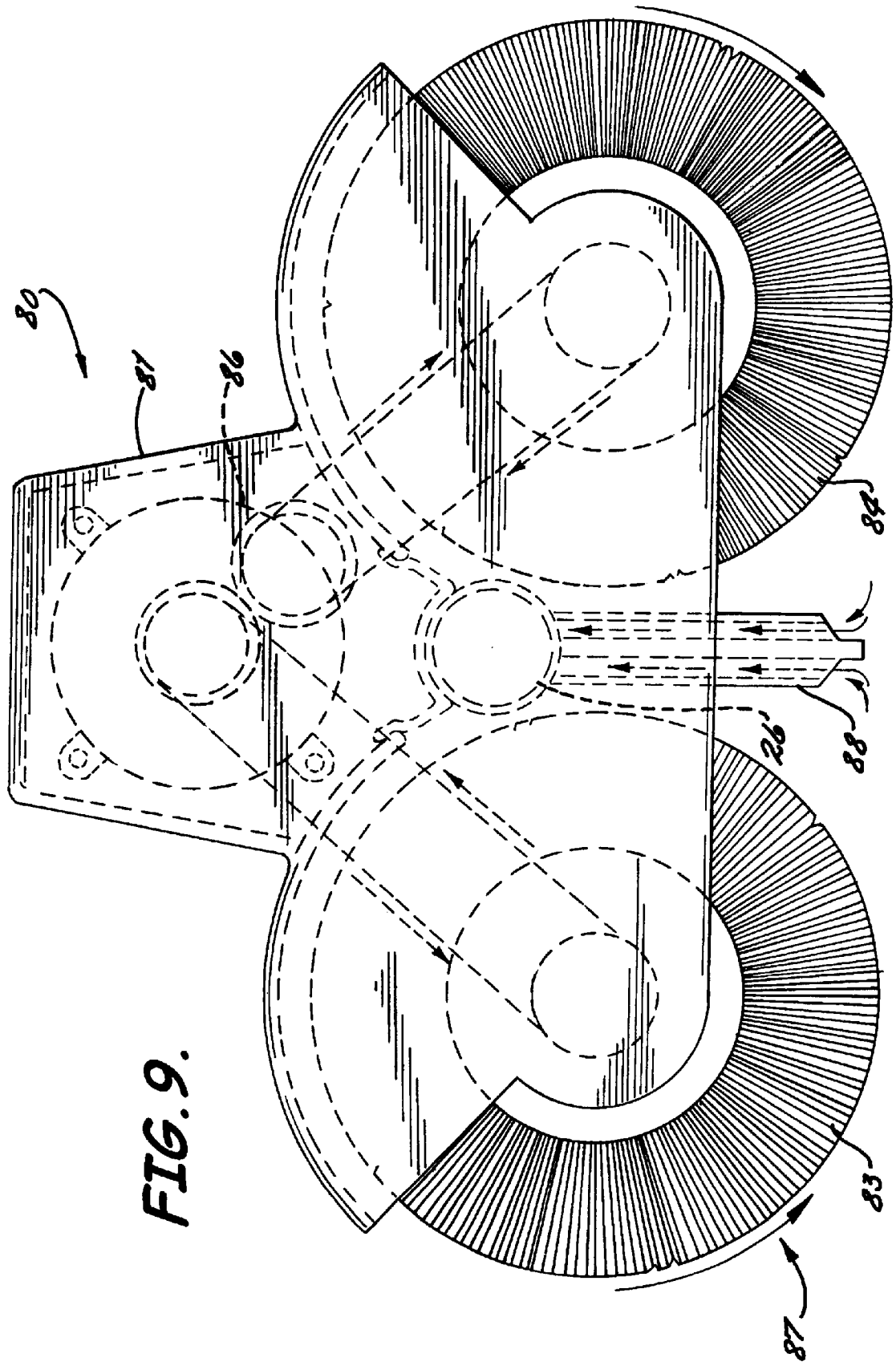
FIG. 9 is a side elevational view of a maintenance tool of an aircraft maintenance apparatus according to an embodiment of the present invention.
Figure 10:
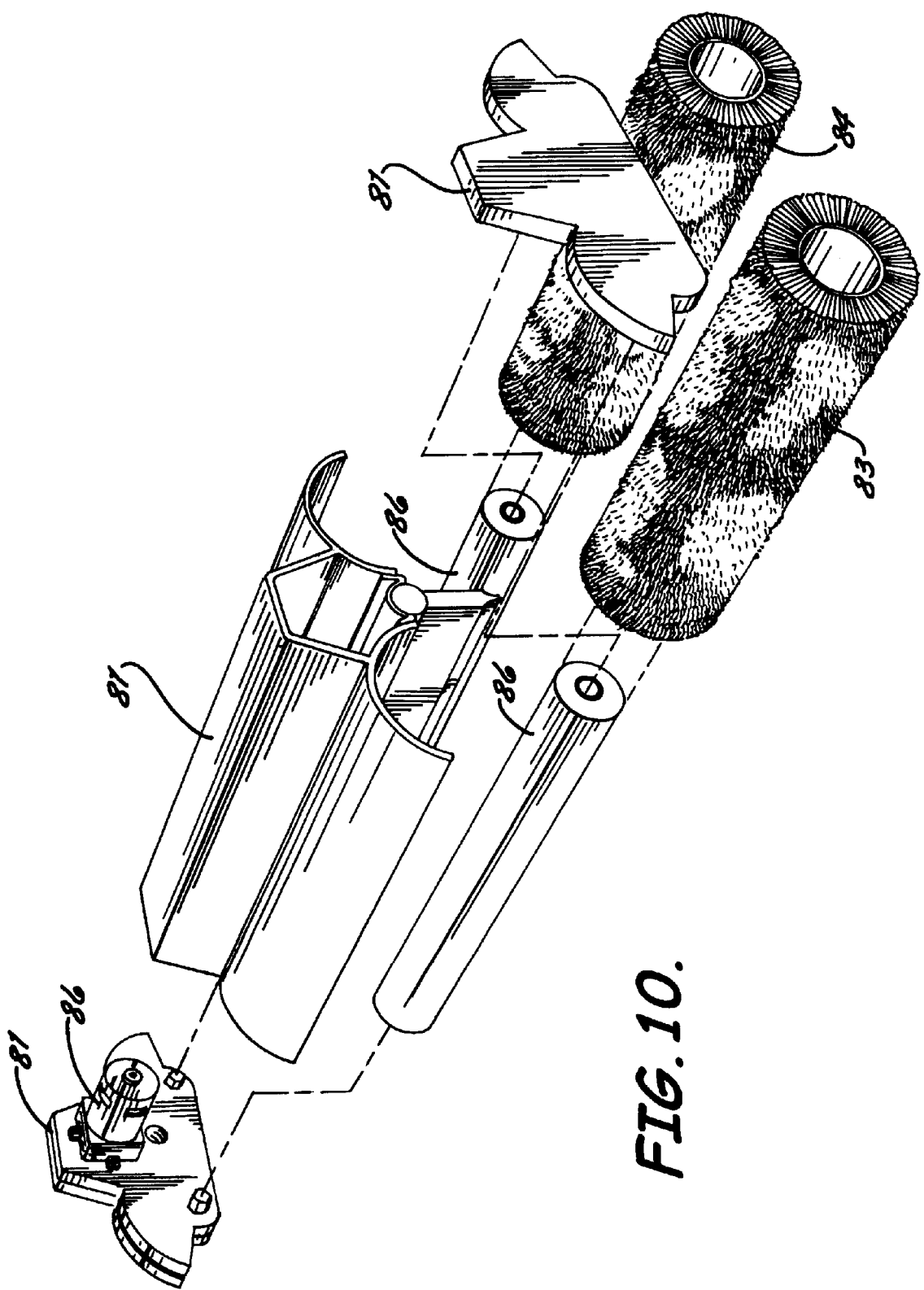
FIG. 10 is an exploded perspective view of a maintenance tool of an aircraft maintenance apparatus according to an embodiment of the present invention.

As perhaps best illustrated in FIGS. 8–10, the present invention also provides a maintenance tool 80 such as for an aircraft A. The maintenance tool 80 preferably includes a tool housing 81, a pair of roll members 83, 84 having at least portions thereof mounted in the tool housing 81, and driving means, e.g., a motor 86, drive rolls or shafts and drive chains, connected to the tool housing 81 for rotatably driving the pair of roll members 83, 84 in opposite rotational directions. The roll members 83, 84, for example, can include bristles, strips of soft cloth, or other brush-like members for cleaning or buffing the outer surface of an aircraft A. The tool 80 also preferably includes a suctioning wiper member 88 which is preferably connected to a fluid collection hose 26. The roll members 83, 84 or other portions of the tool 80 are also preferably connected to a,fluid supply hose 28.

As perhaps best illustrated in FIGS. 13–15, another embodiment of a maintenance tool 80' such as for maintaining an aircraft A preferably includes a tool housing 81', a nozzle 85 connected to the tool housing 81', and nozzle moving means 87 connected to the tool housing 811 for pivotally moving the nozzle 85 in a first plane P1 (see FIG. 14) and for pivotally moving the nozzle 85 in a second different plane P2 (see FIG. 15).

Figure 7:
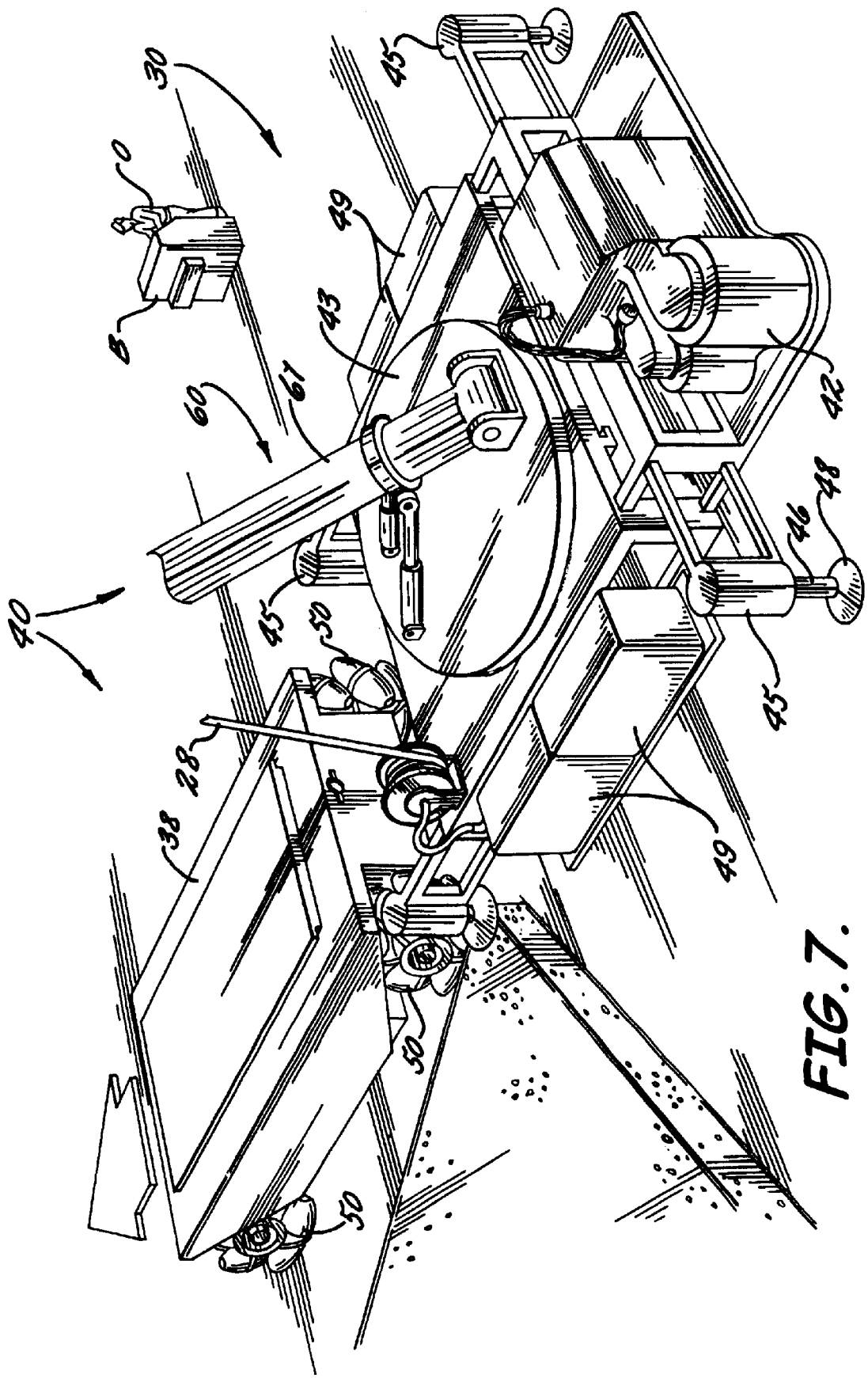
FIG. 7 is a perspective view of an aircraft maintenance apparatus having a transport vehicle and a separable base according to a first embodiment of the present invention.

FIGS. 7 and 16–23 illustrate another embodiment of a mobile base 38 or mobile vehicle 40' of an aircraft maintenance apparatus 30 according to the present invention. Notice that the base 38 can be separable from the general platform of the vehicle 40' as shown in FIG. 7. It will be understood by those skilled in the art, however, that the mobile vehicle 40' can also advantageously be used for other operations such as missile transport, fire fighting operations, or aircraft towing operations. The mobile vehicle 40' preferably includes abase 38 having at least upper and lower portions and a drive 42' connected to the base 38. A plurality of wheels 50' are connected to a lower portion of the base 38 and are also each connected to the drive 42' so that the plurality wheels 50' responsively move the base 38 a plurality of different directions, e.g., radial directions and other directions as previously. described, responsive to the drive 42'. The lower portion of the base 38 includes a plurality of recessed regions 41 into each of which one of the plurality of wheels 50' is mounted. Each of the wheels 50' of the vehicle 40' preferably include a hub 52 and a plurality of roller members 54 dispersed around the hub 52. Each of the plurality of wheels 50' is drivable or movable responsive to the drive 42' in a selected direction independent of each of the other plurality of wheels 50'.

Figure 19:
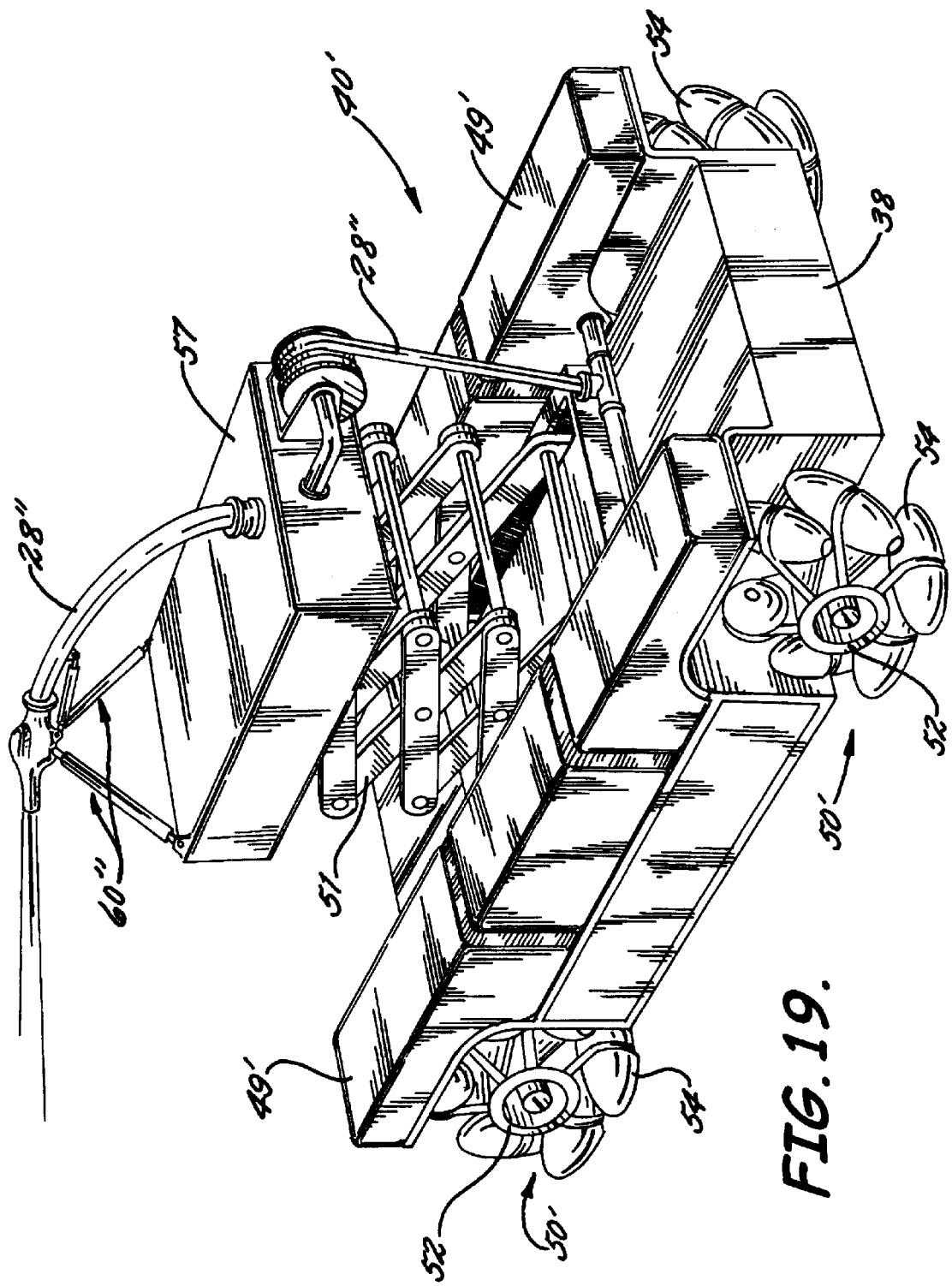
FIG. 19 is a perspective view of an aircraft maintenance apparatus having another embodiment of an aircraft maintenance module according to the present invention.
Figure 20:
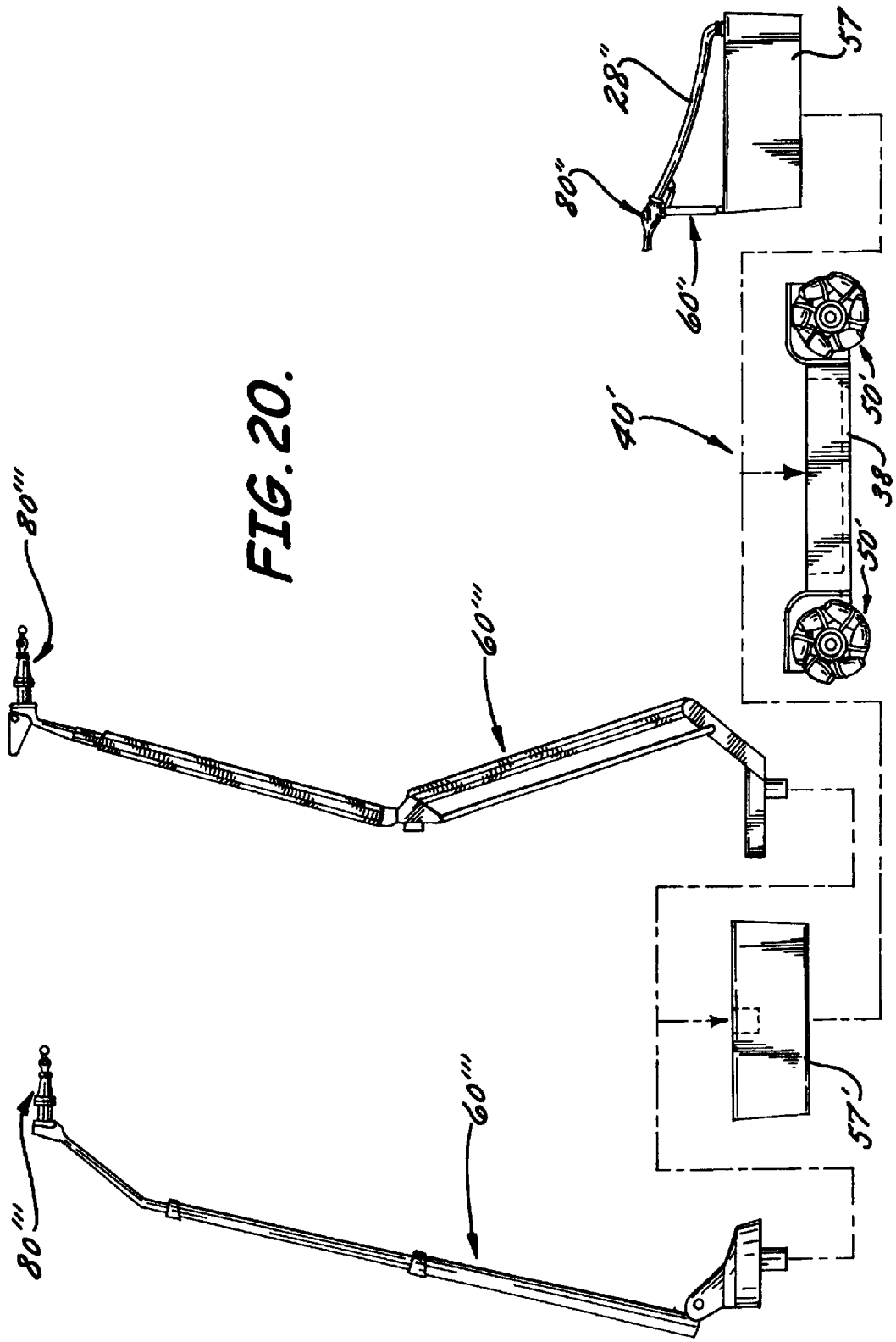
FIG. 20 is an exploded side elevational view of a mobile base portion having a plurality of maintenance modules adapted to be connected thereto of an aircraft maintenance apparatus according to the present invention.
Figure 23:
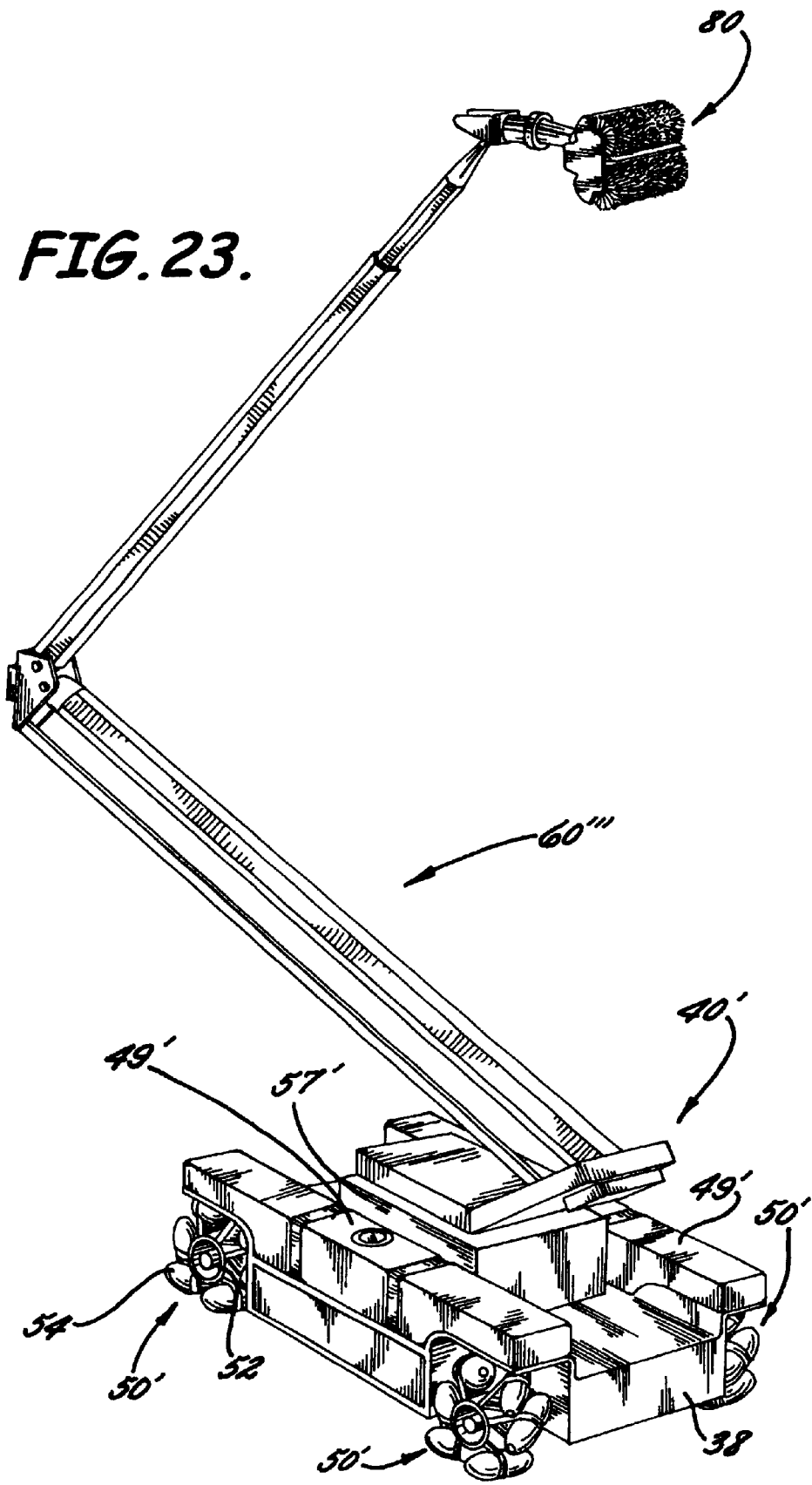
FIG. 23 is a perspective view of an aircraft maintenance apparatus having yet another embodiment of a maintenance tool according to the present invention.

Additionally, a plurality of auxiliary maintenance modules 49' are connected to the upper portion of the base 38. The plurality of auxiliary maintenance modules 49' are positioned along peripheral edges of the base 38'. At least one main maintenance module 58 is preferably connected to the upper portion of the base 38 and has a maintenance tool connected thereto. The at least one main maintenance module 58 further includes a module base portion 57, 57', a boom arm portion 60" rotatably connected to the module base portion 57, 57', and the maintenance tool 80", 80'" being connected to the boom arm portion 60". The boom arm portion 60", 60'", 60"", is preferably extendable between retracted and extended positions. Alternatively, or in addition thereto, retractable and extendable connecting means, e.g., preferably provided by the movable cross members 51 as illustrated in FIG. 19, can be positioned between and connected to the upper portion of the base 38 and the main maintenance module 58 for retracting and extending the main maintenance module 58. At least either one of the plurality of auxiliary maintenance modules 49 or the main maintenance module 58 includes a chamber 6 having at least one maintenance fluid positioned therein. The fluid is preferably a deicing or washing fluid, but other maintenance fluids can be used as well as understood by those skilled in the art. Further, the mobile vehicle 40' can also advantageously include a plurality of leveling legs 46' connected to the base 38 for leveling the base 38 in selected positions, e.g., along support surfaces which are not level so as to balance and adjust the base 38 and/or boom arm 60'. The plurality of leveling legs 46' are preferably movable between retracted and extended positions as previously described. These alternate embodiments of the apparatus 30, 30' and the associate elements connected thereto further advantageously illustrate the modularity and interchangeability of the components of the apparatus 30, 30'.

As illustrated in FIGS. 1–23, the present invention also provides methods of maintaining an aircraft A. A method preferably includes rotating a boom member 60 connected to a base 40, extending the boom member 60 from a retracted position, and rotating an aircraft maintenance tool 80 connected to the boom member 60 during operation of a maintenance procedure upon an aircraft A. The method can also include rotating the base 40 about a support surface. The method can also advantageously include moving the base 40 in at least forward, lateral, diagonal, and rotational directions about the support surface F, supplying fluid to the maintenance tool 80, and suctioning fluid from the maintenance tool 80 (see FIGS. 8–9).

The method can further include the base 40 further having a plurality of support surface registering members 45 each including a support surface contact member or leg 46 and a hydraulic engaging member 48 connected to the support surface contact member 46. The method then includes hydraulically engaging the support surface contact member 46 with the support surface F. The method can also include the aircraft maintenance tool 80 having at least a pair of roll members 83, 84, and the method further including rotatably driving the pair of roll members 83, 84 in opposite rotational directions. Additionally, the base 40, the boom member 60, and the maintenance tool 80 can be either remotely operated or operating with an operator O positioned on the base 40 (see FIGS. 2–3).

Another method according,to the present invention preferably includes a method of treating a surface. The method preferably includes the steps of providing a pair of roll members 83, 84 having surface treating means 87 associated therewith and rotationally driving the pair of roll members 83, 84 in opposite rotational directions. The method can also include each of the pair-of roll members 83, 84 having a roller and a roller cover. The roller cover includes a plurality of surface contact members associated therewith. Also, each of the rollers can advantageously be inflatable, and the method further including inflating each of the inflatable rollers.

The method can also advantageously include supplying fluid to an item for cleaning thereof with the pair of roll members 83, 84 and suctioning fluid from an item adjacent the maintenance tool 80. The step of suctioning fluid includes suctioningly wiping fluid positioned between the pair of roll members 83, 84 (see FIG. 9).

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A mobile vehicle, the mobile vehicle comprising:
    a base having upper and lower portions, the lower portion including a plurality of recessed regions into each of which one of a plurality of wheels is mounted;
    a drive connected to said base; and
    a plurality of wheels each of which is drivable responsive to said drive in a selected direction independent of each of the other plurality of wheels,
    each said plurality of wheels being connected to a lower portion of said base, positioned in one of the plurality of recessed regions, and connected to said drive so that said plurality of wheels responsively move said base in at least three different directions responsive to said drive, each of said wheels including a hub and a plurality of roller members dispersed around said hub.

2. A mobile vehicle as defined in claim 1 further comprising a plurality of auxiliary maintenance modules connected to the upper portion of said base.

3. A mobile vehicle as defined in claim 2 wherein a plurality of auxiliary maintenance modules are positioned along peripheral edges of said base.

4. A mobile vehicle as defined in claim 3 further comprising at least one maintenance module connected to the upper portion of said base and having a maintenance tool connected thereto.

5. A mobile vehicle as defined in claim 4 wherein said at least one maintenance module further includes a module base portion, a boom arm portion rotatably connected to said module base portion, and the maintenance tool being connected to said boom arm portion, said boom arm portion being extendable between retracted and extended positions.

6. A mobile vehicle as defined in claim 4, further comprising retractable and extendable connecting means positioned between and connected to the upper portion of said base and said main maintenance module for reacting and extending said main maintenance module.

7. A mobile vehicle as defined in claim 4, wherein at least either one of said plurality of auxiliary maintenance modules or said main maintenance module includes, a chamber having at least one maintenance fluid positioned therein.

8. A mobile vehicle as defined in claim 1, further comprising a plurality of leveling legs connected to said base for leveling said base in selected positions, said plurality of leveling legs being movable between retracted and extended positions.

9. A mobile vehicle, the mobile vehicle comprising:
    a base having at least upper and lower portions, the upper portion of said base including a maintenance module having a module base portion and a boom arm connected to the module base portion;
    a drive connected to said base; and
    a plurality of wheels connected to a lower portion of said base and connected to said drive so that said plurality of wheels responsively move said base in at least three different directions responsive to said drive, each of said wheels including a hub and a plurality of roller members dispersed around said hub.

10. A mobile vehicle as defined in claim 9, wherein said boom arm portion comprises:
    a first boom arm having a proximal end portion pivotally connected to a rotatable platform of the base, and have retracted and extended positions;

a second boom arm having a proximal end portion mounted to said first boom arm and having retracted and extended positions;

a third boom arm having a medial portion pivotally mounted to the distal end portion of said second boom arm and having retracted and extended positions; and a fourth boom arm having a proximal end portion rotatably mounted to a distal end portion of said third boom arm.

11. A mobile vehicle as defined in claim 10, wherein said fourth boom arm further comprises a plurality of arm links, the plurality of arm links including, the first arm link having a proximal end rotatably connected to the distal end portion of the third boom arm, the second arm link having a proximal end pivotally connected to the distal end of said first arm link, the third arm link having proximal end portions pivotally connected to said second arm link, and a fourth arm link having a proximal end pivotally connected to the distal end of said third arm link.

12. A mobile vehicle, the mobile vehicle comprising:

a base having at least upper and lower portions;

a maintenance tool including a tool housing connected to said base;

a nozzle connected to said tool housing;

nozzle moving means connected said tool housing for pivotally moving said nozzle in a first plane and for pivotally moving said nozzle in a second different plane;

a drive connected to said base; and a plurality of wheels connected to a lower portion of said base and connected to said drive so that said plurality of wheels responsively move said base in at least three different directions responsive to said drive, each of said wheels including a hub and a plurality of roller members dispersed around said hub.

* * * * *